United States Patent [19]

Lin et al.

[11] Patent Number: 4,886,867
[45] Date of Patent: Dec. 12, 1989

[54] NOVEL COMPOSITIONS FROM POLYOXYALKYLENE AMINES AND EPOXIDES

[75] Inventors: Jiang-Jen Lin, Houston; George P. Speranza, Austin, both of Tex.

[73] Assignee: Texaco Chemical Company, White Plains, N.Y.

[21] Appl. No.: 270,898

[22] Filed: Nov. 14, 1988

[51] Int. Cl.$^4$ ..................... C08G 59/02; C08G 59/10
[52] U.S. Cl. ..................................... 528/111; 528/407
[58] Field of Search ............... 528/111, 407; 564/513, 564/551

[56] References Cited

U.S. PATENT DOCUMENTS 3,609,121 9/1971 Lchse et al. ........................ 528/111
4,308,085 12/1981 Horhold et al. ................ 528/111 X
4,554,297 11/1985 Dabi ................................ 528/111 X Primary Examiner—Earl Nielsen
Attorney, Agent, or Firm—Jack H. Park; Kenneth R. Priem; Cynthia L. Kendrick

[57] ABSTRACT

Disclosed is a method for preparing a novel difunctional epoxy resin of the formula:

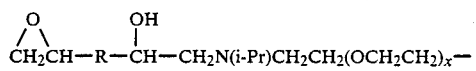
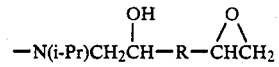

where R is from a Bisphenol A diglycidyl ether and x=2 to ≈10, which comprises reacting an excess of a Bisphenol A diglycidyl ether with a secondary isopropyl amine derivative of a polyoxyalkylene primary diamine or triamine in the presence of acetone.

A method for preparing a novel di- and trifunctional secondary amines of the formula:

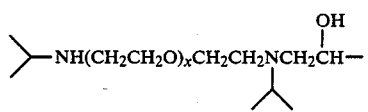
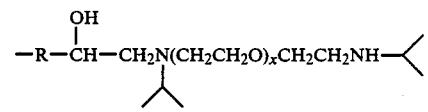

which comprises reacting a Bisphenol A diglycidyl ether with an excess of a secondary isopropyl amine derivative of a polyoxyalkylene primary diamine or triamine in the presence of acetone where R is from Bisphenol A diglycidyl ether and x=1, 2 or 3.

38 Claims, No Drawings

NOVEL COMPOSITIONS FROM POLYOXYALKYLENE AMINES AND EPOXIDES

BACKGROUND OF THE INVENTION

1. Technical Field of the Invention

This invention relates to epoxy resins and more particularly to secondary amine derivatives of polyoxyalkylene amines and to the reaction of them with diepoxides in the presence of acetone in varying molar ratios to form novel compositions predictably containing either amines or epoxides as the terminating, active functionalities. The compositions having epoxides as the terminating active functionalities also contain ether linkages, and tertiary amine and alkyl groups. The compositions having amines as the terminating group also contain phenyl groups.

The products of either embodiment have a variety of uses in epoxy material applications.

2. Related Art

Adducts from amines and mono and diepoxides have been used in industry as curing agents for epoxy resins.

For example, it is known from U.S. Pat. No. 3,538,184 (Nov. 1970) that a polyglycidyl ether can be reacted with a hexamethylenediamine to form solvent free liquid adducts of polyepoxides and polyamines which are suitable for use as curing agents for epoxy resins.

In U.S. Pat No. 3,629,181 there is described a curing agent which comprises the adduct from a polyglycidyl ether of a polyphenyl and a cycloaliphatic or cycloaliphatic-aliphatic di-primary diamine, in which at least one of the primary amino groups is bonded to an endocyclic carbon atom of a cycloaliphatic ring.

In U.S. Pat. No. 3,996,175 there are described moulding materials from epoxide resins based on Bisphenol A or on other bis- or polyphenols and epichlorohydrin which contain aromatic amines as curing agents.

U.S. Pat. No. 4,348,505 discloses the preparation of amine adduct curing agents utilizing epoxides of a functionality greater than two which dramatically enhance the chemical resistance properties of the cured epoxy products over results obtained from either free amines or the conventional amine adducts.

In U.S. Pat. No. 4,540,750 it was disclosed that the preparation of diethyl toluene diamine adduct curing agents with epoxides of a functionality of at least two or urethanes enhances the performance characteristics of cured epoxy and urethane products.

In U.S. Pat. No. 4,608,404 there are described compositions which contain specific groups of oligomeric diamine hardeners and epoxy compounds which when combined with structural fibers produce composites which have improved tensile properties, high compressive strengths and improved impact resistance and, in addition, demonstrate low moisture absorption.

A two-step method of producing N,N,-dimethyl diamine compounds for use as epoxide polyaddition compounds is described in U.S. Pat. No. 4,623,746. The resins formed using this compound as a curative can be produced with improved strength, toughness and hot/wet properties.

From the preceding discussion it is apparent that compositions with a variety of properties which are the product of a wide range of amine and epoxide components are useful in the field of epoxy curing resins.

Background of the Instant Invention

It is known that when a higher ketone such as methylethyl ketone is reacted with a primary amine the reaction product is a Schiff base or an oxazolidine. This Schiff base may thereafter be hydrogenated to provide a secondary amino polyalkoxy alkanol in a two-step reaction. Acetone is not a suitable ketone for the use in a two-step reaction of this nature because of its boiling point.

In U.S. application Ser. No. 07/135,798 it was discovered that when a polyoxyethylene and/or polyoxypropylene primary diamine or triamine is reacted with acetone in the presence of a hydrogenation catalyst and hydrogen, secondary isopropyl amine terminated polyoxyethylene and/or polyoxypropylene primary diamines and triamines can be formed in on step. The polyoxyethylene and/or polyoxypropylene primary diamine or triamine should have a molecular weight within the range of about 200 to about 400, the ratio of acetone to primary diamine or triamine starting material should be within the range of about 1.5 to about 3 mole equivalents of acetone per mole of primary amine group present in the primary diamine or triamine and the reaction should be conducted at a temperature within the range of about 50° to about 200° C. and a pressure within the range of about 100 to 4000 psig, including a hydrogen partial pressure of about 50 to about 2500 psi.

The secondary isopropyl amine derivatives prepared by this process were found useful as flexible curing agents for epoxy resins.

Now there has been discovered a method of reacting these secondary isopropyl amine derivatives of polyoxyalkylene primary diamines and triamines with diepoxides to form, alternatively, a difunctional epoxy resin having epoxides as the terminating functionality, or, di- or trifunctional secondary amines, depending upon the molar ratio of amine to epoxide used. The difunctional polyoxyethylene amine derived epoxy resin is produced by using an excess of epoxide and contains ether linkages, tertiary amines and alkyl groups from the polyoxyalkylene amines. The di- or trifunctional secondary amines are formed by using an excess of amine and they contain phenyl groups.

No method has been found in the related art where secondary isoalkyl amines are reacted with diepoxides to form the novel compositions of the instant invention having the properties described above.

The novel difunctional epoxy resins could be in solid or liquid form depending on starting materials, and, when cured, they afford a transparent, flexible rubbery material.

The novel di- or trifunctional secondary amines containing phenyl groups are useful as epoxy resin curatives. In most use examples, the composition was a non-gelled liquid product which, when cured, afforded a rubbery material with high integrity.

SUMMARY OF THE INVENTION

This invention provides compositions generally useful in epoxy materials applications formed by the reaction of certain secondary isopropyl amine derivatives and diepoxides in the presence of acetone.

The composition formed by reacting secondary isopropyl amine derivatives of polyoxypropylene triamines, such as the JEFFAMINE ® T-series amines with an excess of diepoxide is a solid difunctional epoxy resin.

Light colored liquid compositions which can be cured to form transparent flexible epoxy materials are formed by reacting secondary isopropyl amine derivatives of polyoxyalkylene diamines, such as JEFFAMINE ® D-series and ED-series with an excess of diepoxide.

Novel secondary amines having phenyl groups are in the form of liquid, non-gelled compositions and are formed by combining a molar excess of secondary isopropyl amine derivatives of polyoxypropylene triamines and polyoxyalkylene diamines with diepoxide.

DETAILED DESCRIPTION

This invention discloses novel difunctional epoxy resin compositions and novel di- and trifunctional secondary amines made by reacting secondary isopropyl amine derivatives of polyoxyalkylene primary diamines and triamines with diepoxides, wherein the molar ratio is critical in determining the product. The difunctional epoxy resin compositions contain ether linkages and tertiary amine and alkyl groups from the polyoxyalkylene amines with epoxides as the terminating active functionality. The di- and trifunctional secondary amines contain phenyl groups, or, in one case, a cyclohexane group, and have amines as the terminating functionality.

In practice of this invention epoxy resins and curing materials are prepared by reacting secondary isopropyl amine derivatives in the presence of diepoxides, such as Bisphenol A diglycidyl ether.

Preparation of the secondary isopropyl amine derivatives is described in related U.S. patent application Ser. No. 07/135,798, the contents of which is incorporated herein by reference. There is disclosed in that application a method for producing secondary isopropyl amine terminated polyoxyethylene and/or polyoxypropylene diamines or triamines in a one-step reaction by hydrogenating a polyoxyethylene and/or polyoxypropylene primary diamine or triamine with hydrogen in the presence of a hydrogenation catalyst, hydrogen and acetone.

In the narrower and more preferred practice of one embodiment of the instant invention a series of liquid or solid forms of difunctional epoxy resins are prepared from secondary isopropyl amine derivatives of polyoxyethylene and/or polyoxypropylene primary diamines or triamines such as JEFFAMINE ® amines, and a polyglycidyl compound such as Shell's EPON ® 828 or EPONEX ® 151. This can be represented by the following equation:

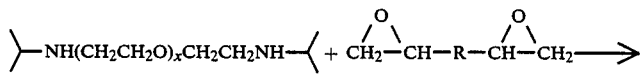
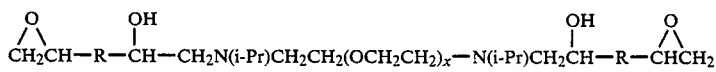

where x=2 to ≈10.

The difunctional epoxy resins are non-gelled and are obtained using a molar excess of diepoxide in the presence of an acetone solvent. The products are useful in areas of mixed epoxy material synthesis as demonstrated in Example 3.

In another embodiment these secondary isopropyl amines in the form of N,N'-diisopropyl amines were reacted with a diepoxide to form di- and trifunctional secondary amines which comprised liquid, viscous amine products containing at least one phenyl group and represented by the following equation:

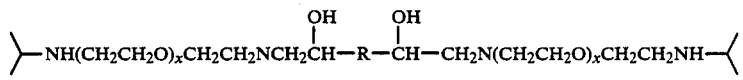

where R is from an epoxy resin such as Bisphenol A diglycidyl ether, x=1, 2, 3 or others from a JEFFAMINE ® amine.

The reactants of the instant invention are secondary isopropyl amine terminated polyoxyethylene diamines and/or polyoxypropylene diamines or triamines, which can be prepared from JEFFAMINE ® D-series and ED-series and T-series amines, and diepoxides, including, but not limited to the diglycidyl ether of Bisphenol A in the presence of a solvent.

Source of the Amine Reactant

The secondary isopropyl amine derivatives used as reactants in the present invention include derivatives of polyoxyethylene and/or polyoxypropylene primary diamines or triamines prepared by the reaction of a polyoxyethylene and/or polyoxypropylene primary diamine or triamine with acetone in the presence of a hydrogenation catalyst and hydrogen. A polyoxyethylene and/or polyoxypropylene primary diamine or triamine having a molecular weight of about 200 to about 400 is reacted with acetone in the presence of hydrogen and a hydrogenation catalyst to provide a secondary isopropyl amine terminated polyoxyethylene and/or polyoxypropylene reaction product.

In general, the polyoxyalkylene polyamine starting material used to make the secondary isopropyl amine reactant may be defined as a polyoxyalkylene polyamine, having the formula:

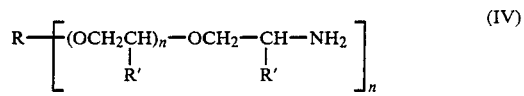
(IV)

wherein R is the nucleus of an oxyalkylation-susceptible polyhydric alcohol containing 2 to 12 carbon atoms and 2 or 3 hydroxyl groups, and R' is hydrogen or methyl, n is a number having an average value of 0 to 50, and m is an integer having a value of 2 to 3.

The polyamine may be in the form of a polyoxypropylene triamine. The use of the derivative of low molecular weight triamines is demonstrated in the examples. In general, the average molecular weight of the polyoxypropylene triamine starting material will be from about 200 to about 5000. An example of appropriate polyoxypropylene triamines that may be used as a starting material for the present invention include triamines sold by Texaco Chemical Company as JEFFAMINE® T-series products having the formula:

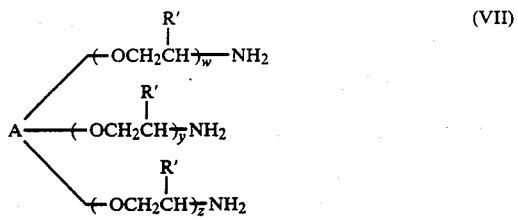

wherein A represents the nucleus of an oxyalkylation susceptible trihydric alcohol containing about 3 to about 6 carbon atoms, w, y and z are numbers and the average value of the sum of w+y+z is from about 4 to about 100.

An example of such a product is a commercial product having an average molecular weight of about 400 wherein A represents a trimethylol propane nucleus, and the product contains about 5 to about 6 moles of propylene oxide (JEFFAMINE® T-403 amine) and a product having an average molecular weight of about 5000 wherein A represents a glycerol nucleus and the product contains about 85 moles of propylene oxide (JEFFAMINE® T-5000).

Also demonstrated in the examples are secondary isopropyl amine derivatives derived from polyoxyalkylene diamines.

One group of appropriate polyoxyalkylene diamines that can be used are those that are sold by the Texaco Chemical Company as JEFFAMINE® D-series products having the formula:

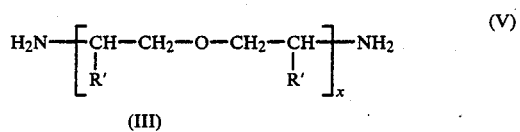

wherein R' independently represents hydrogen or methyl and x is a number having an average value of about 1 to about 60.

Representative products having this structural formula include polyoxypropylene diamines (wherein R, is methyl) having an average molecular weight of about 230 wherein the value of x is between 2 and 3 (JEFFAMINE® D-230 amine), polyoxypropylene diamines having an average molecular weight of about 400 wherein x has a value between about 5 and 6 (JEFFAMINE® D-400 amine), and a polyoxypropylene diamine product having an average molecular weight of about 2000 wherein x has a value of about 33 (JEFFAMINE® D-2000 amine) and a product having an average molecular weight of about 4000 wherein x has a value of about 60 (JEFFAMINE® D-4005 amine).

Finally a suitable group of amines are amine terminated polyethylene glycols, such as those marketed by Texaco Chemical Co. under the tradename JEFFAMINE® EDR-148 AND -192. JEFFAMINE® EDR-148 is an amine terminated triethylene glycol having the formula:

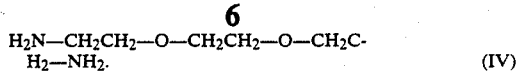

JEFFAMINE® EDR-192 is an amine terminated tetraethylene glycol having the formula:

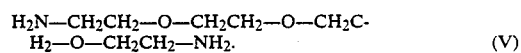

To form the secondary isopropyl amine derivatives used as reactants the primary amine starting materials are continuously passed over a bed of pelleted hydrogenation catalysts in the presence of acetone. As stated above, further detail is described in U.S. patent application Ser. No. 07/135,798.

The Epoxide Material

The epoxy resins which may be used herein contain two or more epoxy groups having the following formula:

The epoxy groups can be terminal epoxy groups or internal epoxy groups. The epoxides are of two general types: polyglycidyl compounds or products derived from epoxidation of dienes or polyenes. Polyglycidyl compounds contain a plurality of 1,2-epoxide groups derived from the reaction of a polyfunctional active hydrogen-containing compound with an excess of an epihalohydrin under basic conditions. When the active hydrogen compound is a polyhydric alcohol or phenol, the resulting epoxide composition contains glycidyl ether groups. A preferred group of polyglycidyl compounds are made via condensation reactions with 2,2-bis(4-hydroxyphenyl)propane, also known as Bisphenol A, and have structures such as VI.

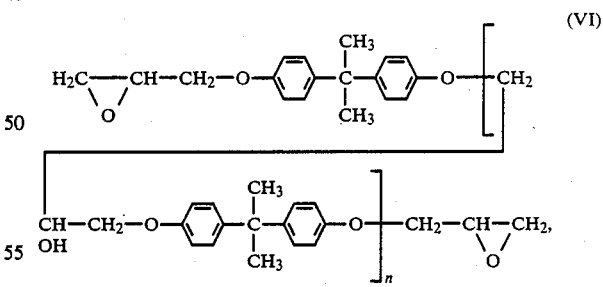

where n has a value from about 0 to about 15. These epoxides are Bisphenol A epoxy resins. They are available commercially under tradenames such as "EPON® 828," "EPON® 1001" and "EPON® 1009" from Shell Chemical Co. and as "DER® 331", "DER® 332", and "DER® 334" from Dow Chemical Co. The most preferred Bisphenol A epoxy resins have an "n" value between 0 and 10.

The Examples demonstrate the effectiveness of a Bisphenol A epoxy resin of the formula:

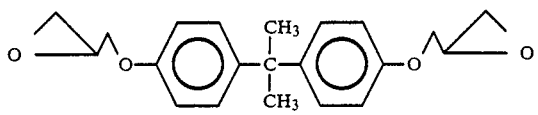

available commercially as DER ® 331 (Dow Chemical) or EPON ® 828 (Shell). Another suitable epoxy resin is the hydrogenated product of EPON ® 828 which is sold under the tradename EPONEX ® 151.

Solvent

The use of a solvent is preferred and was essential in the practice of this invention to avoid gel formation. Suitable solvents include ketones and alcohols.

Preferred solvents are ketones. Ketones which are useful include acetone, diethylketone and methyl isobutylketone. The preferred ketone is acetone.

The preferred amount of solvents in the reaction mixture is from 5 to 50%. The ketone solvents are used to avoid gel-formation since the amine-ketone enamine complex tends to retard the reaction rate.

Preparation of Novel Epoxy Resins and Secondary Amines

The new adduct curing agents are manufactured according to the invention by reacting the secondary isopropyl amine derivatives of polyoxyalkyleneamine with the Bisphenol A epoxy resin in varying molar ratios. To produce the difunctional epoxy composition an excess of Bisphenol A epoxy resin was critical. A ratio of at least 1 to 5 moles of the epoxide group equivalent of the polyglycidyl ether per amine in acetone was used. The preferred ratio was 0.25 to 0.5 moles of amine to 1 mole of epoxide.

To produce the novel di- and trifunctional amines an excess of amine was critical. A ratio of from 1 to 10 moles of amine per epoxide group equivalent of polyglycidyl ether in acetone was used. The preferred molar ratio of amine to epoxide was dependent upon the properties desired in the product and generally was from about 2 to 4 moles of amine to one mole of diepoxide.

The reaction took place with warming to a temperature of from 0° C. to 300° C. and preferably from room temperature to 180° C. at $N_2$ atmosphere for 1 to 4 hours, then cooling to room temperature.

Products

Where the difunctional epoxy resin was the product of a secondary amine derived from a low molecular weight polyoxypropylene triamine such a JEFFAMINE ® T-403 and a diglycidyl ether such as EPON ® 828 the product was a solid.

Where the difunctional epoxy resin was the product of a JEFFAMINE ® amine-derived secondary amine made from a polyoxypropylene diol, such as JEFFAMINE ® D-230 OR D-400 and a diglycidyl ether such as EPON ® 828 the product was a semisolid or solid and, using the hydrogenated EPONEX ® 151 the product was a liquid.

Where the difunctional epoxy resin was the product of a JEFFAMINE ® amine-derived secondary isopropyl amines derived from an amine terminated polyethylene glycol, such as JEFFAMINE ® EDR-148 and 192 and a diglycidyl ether such as EPON ® 828, the product was a semisolid. Again, where the hydrogenated epoxide, EPONEX ® 151 was used, the product was a liquid.

The curing agent formulations manufactured according to the invention show a number of advantages.

The products are useful in areas of mixed epoxy material syntheses, poly(epoxy)-(urea) synthesis as epoxy curing agents in cases needing flexibility.

Products were identified by several methods. The compositions were evidenced by amine, hydroxy and molecular weight analysis.

To illustrate the process of the invention the following examples are given. Example 1 illustrates the synthesis of N,N,-diisopropyl JEFFAMINE ® amine and Example 2 demonstrates preparation of the novel epoxide-terminated adduct. Example 3 demonstrates uses. Examples 4-11 in Table I show the variation in properties of the product depending on the polyoxyalkylene amine used for the secondary amine derivative. Examples 12 through 22 demonstrate preparation and use of the di- or trifunctional secondary amine. It is to be understood that the examples are given in the way of illustration and are not to be regarded as limiting the invention in any way.

EXAMPLE 1

The syntheses of novel N,N'-diisopropyl JEFFAMINE ® EDR-148, EDR-192, D-230, D-400 and T-403 were disclosed in U.S. application Ser. No. 07/135,798. These amines are secondary amines prepared from JEFFAMINE ® amines, acetone and hydrogen using a catalyst. Among these new products, N,N'-diisopropyl JEFFAMINE ® EDR-148 and EDR-192 are distilled products. The Preparation of Adduct of N,N'-Diisopropyl JEFFAMINE ® EDR-92 and EPONEX 151 (Shell's Product)

To a 250 ml three-necked flask equipped with a thermometer, Dean-Stark trap, stirrer and nitrogen inlet line was charged N,N'-diisopropyl JEFFAMINE ®EDR-192 (27.6g, 0.1M), EPONEX ® 151 (98.7g, 0.2M, Shell's hydrogenated product of EPON ® 828) and acetone (50 ml). The mixture was heated slowly to remove acetone and then to 155°-165° C. for 2 hours to give a very light colored semisolid (pourable). The analyses indicated 1.56 meq/g for total amine (calc. 1.57) and 7800 cs/50° C. for viscosity.

EXAMPLE 3

Usage of Product

The mixture of N,N'-diisopropyl EDR-192 and EPONEX ® 151 adduct (6300-70, 10 g) and EDR-148 (0.6 g) was mixed well and poured into a mold and cured at 80° C. overnight to give a transparent, flexible rubbery material.

Other examples are cited in the attached table.

TABLE I

Reactions of JEFFAMINE ® Amine-Derived Secondary Amine and Diepoxide Epoxide-Terminated Products

| Ex. | Secondary Amine | Diepoxide | Molar Ratio of Amine to Diepoxide | Amine Meq/g | Total Acet. | Viscous. cs/50° C. |
|---|---|---|---|---|---|---|
| 4 | i-Pr₂ EDR-148 | EPON ® 828 | 1:2.50 (Semisolid) | 1.66 | — | 37,000 |
| 5 | i-Pr₂ EDR-192 | EPON ® 828 | 1:2.50 (Semisolid) | 1.62 | 65 | High |
| 6 | i-Pr₂ EDR-192 | EPONEX ® 151 | 1:2.0 (Liquid) | 1.56 | — | 7800 |
| 7 | i-Pr₂ D-230 | EPON ® 828 | 1:2.0 (Semisolid) | — | — | — |
| 8 | i-Pr₂ D-230 | EPONEX ® 151 | 1:2.0 (Liquid) | 1.51 | 3.4 | 28,000 |
| 9 | i-Pr₂ D-230 | EPONEX ® 151 | 1:2.0 (Liquid) | 1.46 | — | 20,000 |
| 10 | i-Pr₂ D-400 | EPON ® 828 | 1:2.0 (Semisolid) or Solid | — | — | — |
| 11 | i-Pr₂ T-403 | EPON ® 828 | 1:4.0 (Solid) | — | — | — |

EXAMPLE 12

Preparation of Di-Secondary Amine-Containing Phenyl Group

To a 250 ml three-necked flask equipped with a thermometer, Dean-Stark trap, stirrer and N₂ line was charged N,N'-diisopropyl EDR-148 (37 g, 0.16M), EPON ® 828 (30 g, 0.08M, Shell's) and acetone (30 ml). The mixtures were heated to 145°-60° C. for 4 hours and under vacuum for 30 min. to afford a light yellow liquid, having analyses of total amine 3.89 meq/g (2°-amine), primary amine 0.03 meq/g, total acetylatable 4.2 meq/g and viscosity 11,000cs/50° C.

EXAMPLE 13

Usage

The mixture of Example 12 (20 g) and EPON ® 828 (9 g) were mixed well, poured into a mold and cured at 100° C. to afford a rubbery material with high integrity. Other examples are cited in the attached table.

TABLE II

Reactions of JEFFAMINE ® Amine-Derived Secondary Amine and Diepoxide-Amine-Terminated Products

| Ex. | Secondary Amine | Diepoxide | Molar Ratio of Amine to Diepoxide | Amine Meg/g | Total Acet. | Viscos. cs/50° C. |
|---|---|---|---|---|---|---|
| 12 | i-Pr₂ EDR-148 | EPON ® 828 | 2.0:1 (Liquid) | 3.89 | 4.20 | 11,000 |
| 14 | i-Pr₂ BAEE | EPON ® 828 | 2.0:1 (Semisolid) | 4.58 | 4.78 | — |
| 15 | i-Pr₂ EDR-192 | EPON ® 828 | 2.0:1 (Liquid) | 4.10 | 4.34 | 2,800 |
| 16 | i-Pr₂ D-230 (6250-65) | EPON ® 828 | 2.0:1 (Liquid) | 3.87 | 4.28 | 3,700— |
| 17 | i-Pr₂ D-230 (6250-65) | EPONEX ® 151 | 2.0:1 (Liquid) | 3.46 | 3.80 | 3,000 |
| 18 | i-Pr₂ D-400 (6250-2) | EPON ® 828 | 2.0:1 (Liquid) | 2.78 | 3.99 | 1,800 |
| 19 | i-Pr₂ D-400 (6250-2) | EPON ® 828 | 2.6:1 (Liquid) | 2.98 | 4.12 | 480 |
| 20 | i-Pr₃ T-403 | EPON ® 828 | 2.0:1 (Liquid) | 4.04 | 4.66 | 4,700 |
| 21 | DETDA (Comparative) | EPON ® 828 | 4:1 | Dark, hard solid | | |
| 22 | DETA (Comparative) | EPON ® 828 | 2:1 | Dark, hard solid | | |

What is claimed is:

1. method for preparing a novel disfunctional epoxy resin which comprises reacting an excess of diepoxide with a secondary isopropylamine derivative of a polyoxyalkylene primary or triamine in the presence of acetone.

2. A method of preparing a novel disfunctional epoxy resin of the formula:

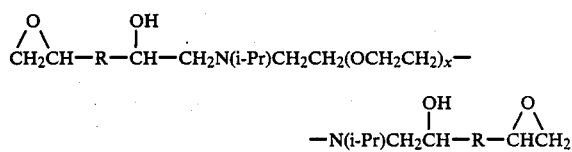

where R is from a Bisphenol A diglycidyl ether and x=2 to ≈10, which comprises reacting an excess of a Bisphenol A diglycidyl polyoxyalkylene primary diamine or triamine in the presence of acetone.

3. The method of claim I wherein the Bisphenol A diglycidyl ether has the formula:

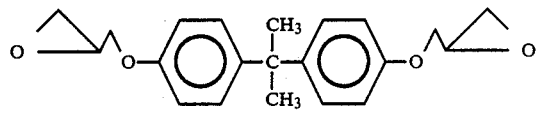

4. The method of claim 2 wherein the secondary isopropyl amine derivative of said polyoxyalkylene polyamine has the formula:

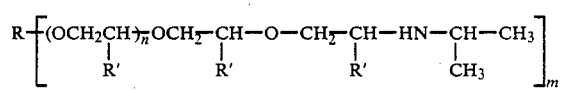

where R is the nucleus of an oxyalkylation susceptible polyhydric alcohol containing 1 to 12 carbon atoms and 2 or 3 hydroxyl groups, R' is hydrogen or methyl, n is a number sufficient to impart a molecular weight of about 200 to 400 to the molecule and m is a positive integer having a value of 2 or 3.

5. The method of claim 2 wherein the secondary isopropyl amine is derived from a polyoxyalkylene having the formula:

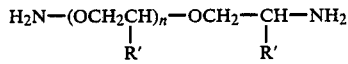

wherein n is a number sufficient to impart a molecular weight of about 200 to 400 to the molecule and R' represents hydrogen or methyl.

6. The method of claim 5 wherein R' is methyl and the polyoxypropylene diamine has an average molecular weight of about 230.

7. The method of claim 5 wherein R' is methyl and the polyoxypropylene diamine has an average molecular weight of about 400.

8. The method of claim 5 wherein R' is hydrogen and n is 3.

9. The method of claim 5 wherein R' is hydrogen and n is 4.

10. The method of claim 2 wherein the polyoxyalkylene amine is a polyoxypropylene triamine of the formula:

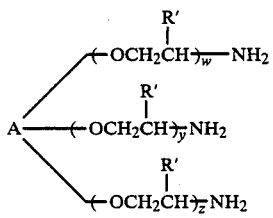

wherein R' represents hydrogen or methyl, A represents the nucleus of an oxyalkylation-susceptible trihydric alcohol containing 3 to 12 carbon atoms, X, Y, and Z represent numbers and the sum of x+y+z represent a number sufficient to impart a molecular weight of about 220 to about 400 to the molecule.

11. The method of claim 10 wherein A represents a trimethyol propane nucleus and the triamine has an average molecular weight of about 400.

12. A method for preparing novel di- and trifunctional secondary amines of the formula:

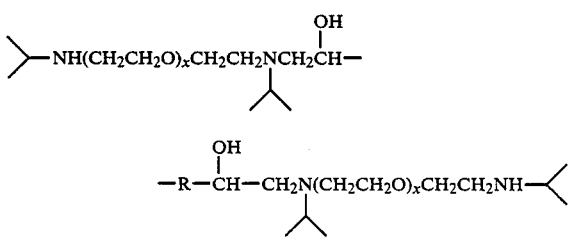

which comprises reacting a Bisphenol A diglycidyl ether with an excess of a secondary isopropyl amine derivative of a polyoxyalkylene primary diamine or triamine in the presence of acetone wherein in the above formula R is from Bisphenol A diglycidyl ether and x=1, 2 or 3.

13. The method of claim 12 wherein the Bisphenol A ediglycidal ether has the formula:

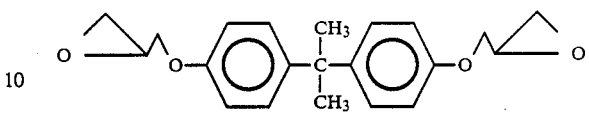

14. The method of claim 12 wherein the secondary amine derivative of said polyoxyalkylene polyamine has the formula:

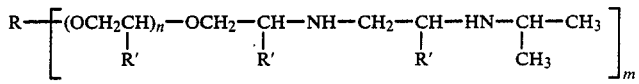

where R is the nucleus of an oxyalkylation susceptible polyhydric alcohol containing 1 to 12 carbon atoms and 2 or 3 hydroxyl groups, R' is hydrogen or methyl, n is a number sufficient to impart a molecular weight of about 200 to 400 to the molecule and m is a positive integer having a value of 2 or 3.

15. The method of claim 12 wherein the secondary isopropyl amine is derived from a polyoxyalkylene having the formula:

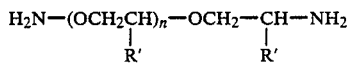

wherein n is a number sufficient to impart a molecular weight of about 200 to 400 to the molecule and R' represents hydrogen or methyl.

16. The method of claim 15 wherein R' is methyl and the polyoxypropylene diamine has an average molecular weight of about 230.

17. The method of claim 15 wherein R' is methyl and the polyoxypropylene diamine has an average molecular weight of about 400.

18. The method of claim 15 wherein R' is hydrogen and n is 3.

19. The method of claim 15 wherein R' is hydrogen and n is 4.

20. The method of claim 15 wherein the polyoxyalkylene amine is a polyoxypropylene triamine of the formula:

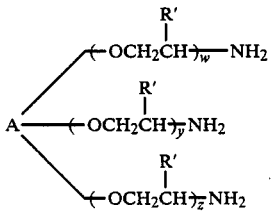

wherein R' represents hydrogen or methyl, A represents the nucleus of an oxyalkylation-susceptible trihydric alcohol containing 3 to 12 carbon atoms, x, y and z represent numbers and the sum of x+y+z represent a number sufficient to impart a molecular weight of about 220 to about 400 to the molecule.

21. A difunctional epoxy resin composition useful in epoxy material applications having the formula:

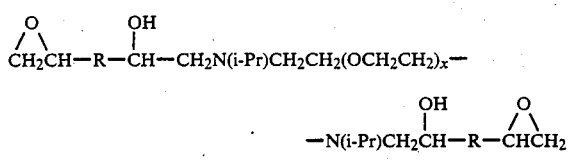

consisting essentially of 0.5 to 1 mole of a secondary isopropyl amine derivative of a polyoxyalkylene primary diamine or triamine and 2 to 4 moles of a Bisphenol A diglycidyl ether, where R is from a Bisphenol A diglycidyl ether and $x =$ from 2 to $\approx 10$.

22. The composition of claim 21 wherein the Bisphenol A diglycidyl ether has the formula:

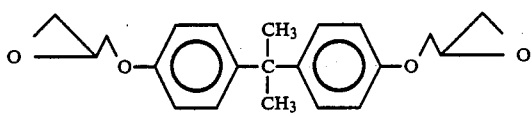

23. The composition of claim 21 wherein the secondary isopropyl amine derivative of said polyoxyalkylene polyamine has the formula:

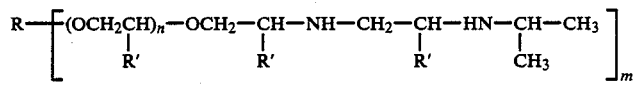

where R is the nucleus of an oxyalkylation susceptible polyhydric alcohol containing 1 to 12 carbon atoms and 2 or 3 hydroxyl groups, R' is hydrogen or methyl, n is a number sufficient to impart a molecular weight of about 200 to 400 to the molecule and m is a positive integer having a value of 2 or 3.

24. The composition of claim 23 wherein the secondary isopropyl amine is derived from a polyoxyalkylene having the formula:

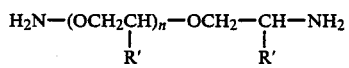

wherein n is a number sufficient to impart a molecular weight of about 200 to 400 to the molecule and R' represents hydrogen or methyl.

25. The composition of claim 24 wherein R' is methyl and the polyoxypropylene diamine has an average molecular weight of about 230.

26. The composition of claim 24 wherein R' is methyl and the polyoxypropylene diamine has an average molecular weight of about 400.

27. The composition of claim 24 wherein R' is hydrogen and n is 3.

28. The composition of claim 24 wherein R' is hydrogen and n is 4.

29. The method of claim 24 the polyoxyalkylene is a polyoxypropylene triamine having the formula:

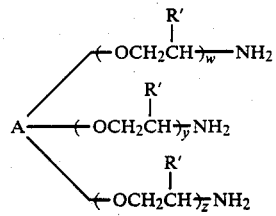

wherein R' represents hydrogen or methyl, A represents the nucleus of an oxyalkylation-susceptible trihydric alcohol containing 3 to 12 carbon atoms, x, y and z represent numbers and the sum of $x+y+z$ represent a number sufficient to impart a molecular weight of about 220 to about 400 to the molecule.

30. A di- or trifunctional secondary amine useful as an epoxy resin curative having the formula:

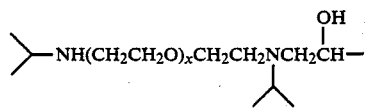

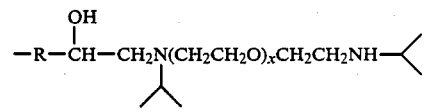

consisting essentially of 0.5 to 1 mole of a Bisphenol A diglycidyl ether and 1 to 4 of a secondary isopropyl amine derivative of a polyoxyalkylene primary diamine or triamine where R is from Bisphenol A diglycidyl ether and $x = 1$, 2 or 3.

31. The composition of claim 30 wherein the Bisphenol A diglycidyl ether has the formula:

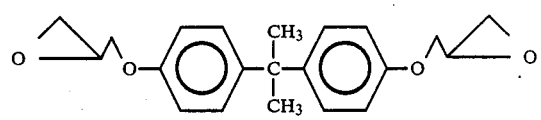

32. The composition of claim 30 wherein the secondary isopropyl amine derivative of said polyoxyalkylene polyamine has the formula:

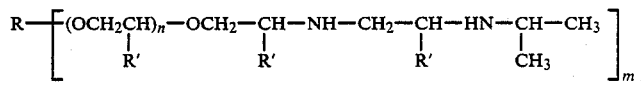

where R is the nucleus of an oxyalkylation susceptible polyhydric alcohol containing 1 to 12 carbon atoms and 2 or 3 hydroxyl groups, R' is hydrogen or methyl, n is a number sufficient to impart a molecular weight of about 200 to 400 to the molecule and m is a positive integer having a value of 2 or 3.

33. The composition of claim 32 wherein the secondary isopropyl amine is derived from a polyoxyalkylene having the formula:

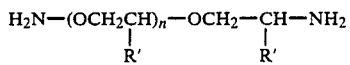

wherein n is a number sufficient to impart a molecular weight of about 200 to 400 to the molecule and R' represents hydrogen or methyl.

34. The composition of claim 33 wherein R' is methyl and the polyoxypropylene diamine has an average molecular weight of about 230.

35. The composition of claim 33 wherein R' is methyl and the polyoxypropylene diamine has an average molecular weight of about 400.

36. The composition of claim 33 wherein R' is hydrogen and n is 3.

37. The composition of claim 33 wherein R' is hydrogen and n is 4.

38. The composition of claim 33 wherein the polyoxyalkylene amine is a polyoxypropylene triamine of the formula:

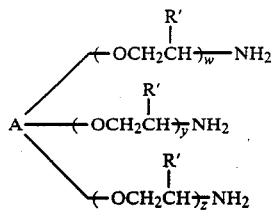

wherein R' represents hydrogen or methyl, A represents the nucleus of an oxyalkylation-susceptible trihydric alcohol containing 3 to 12 carbon atoms, x, y and z represent numbers and the sum of x+y+z represent a number sufficient to impart a molecular weight of about 220 to about 400 to the molecule.

* * * * *

UNITED STATES PATENT AND TRADEMARK OFFICE
CERTIFICATE OF CORRECTION

PATENT NO. : 4,886,867
DATED : December 12, 1989
INVENTOR(S) : Jiang-Jen Lin and George Phillip Speranza It is certified that error appears in the above-identified patent and that said Letters Patent is hereby corrected as shown below:

Claim 1, Col. 9, line 62, before "method" insert --A--.

Claim 2, Col. 10, line 26, after "diglycidyl" insert --ether--.

Claim 13, Col. 12, line 5, delete "ediglycidal" and insert therefor --diglycidal--.

Signed and Sealed this

Twenty-third Day of October, 1990

Attest:

HARRY F. MANBECK, JR.

*Attesting Officer*     *Commissioner of Patents and Trademarks*